US008751451B2

(12) United States Patent
Uola et al.

(10) Patent No.: US 8,751,451 B2
(45) Date of Patent: Jun. 10, 2014

(54) METHOD AND APPARATUS FOR FACILITATING SWITCHING BETWEEN DEVICES

(75) Inventors: Juha Tapani Uola, Tampere (FI); Johan Wilhelm Wikman, Helsinki (FI); Oskari Koskimies, Helsinki (FI); Lauri Paimen, Tampere (FI); Pekka Reijula, Tampere (FI)

(73) Assignee: Nokia Corporation, Espoo (FI)

( * ) Notice: Subject to any disclaimer, the term of this patent is extended or adjusted under 35 U.S.C. 154(b) by 84 days.

(21) Appl. No.: 13/445,496

(22) Filed: Apr. 12, 2012

(65) Prior Publication Data
US 2013/0275373 A1 Oct. 17, 2013

(51) Int. Cl.
*G06F 17/00* (2006.01)

(52) U.S. Cl.
USPC ........... 707/634; 707/610; 709/238; 715/200; 715/700

(58) Field of Classification Search
None
See application file for complete search history.

(56) References Cited

U.S. PATENT DOCUMENTS

| 6,947,975 | B2 | 9/2005 | Wong et al. | |
|---|---|---|---|---|
| 7,623,892 | B2 * | 11/2009 | Hawkins | 455/556.1 |
| 7,757,055 | B2 | 7/2010 | Tsukada et al. | |
| 7,844,297 | B2 | 11/2010 | Hawkins | |
| 7,860,828 | B2 | 12/2010 | Kast et al. | |
| 7,882,061 | B1 | 2/2011 | Kast | |
| 7,979,087 | B2 * | 7/2011 | Hawkins | 455/556.1 |
| 8,103,308 | B2 * | 1/2012 | Jeffrey | 455/556.1 |
| 8,175,643 | B1 * | 5/2012 | Hawkins | 455/556.1 |
| 8,175,644 | B1 * | 5/2012 | Jeffrey | 455/556.1 |
| 2004/0098425 | A1 | 5/2004 | Wiss et al. | |
| 2006/0026587 | A1 | 2/2006 | Lemarroy et al. | |
| 2006/0242278 | A1 * | 10/2006 | Hawkins | 709/221 |
| 2010/0042733 | A1 * | 2/2010 | Jeffrey | 709/228 |
| 2010/0269120 | A1 | 10/2010 | Manttari et al. | |
| 2011/0045873 | A1 * | 2/2011 | Jeffrey | 455/557 |
| 2011/0196826 | A1 * | 8/2011 | Retief et al. | 707/621 |
| 2012/0110187 | A1 * | 5/2012 | Hawkins | 709/226 |
| 2013/0007499 | A1 * | 1/2013 | Moy | 713/400 |

FOREIGN PATENT DOCUMENTS

| EP | 2017734 A2 | 1/2009 |
|---|---|---|
| EP | 2367106 A1 | 9/2011 |

OTHER PUBLICATIONS

International Search Report for Application No. PCT/FI2013/050199, dated Jun. 27, 2013.

* cited by examiner

*Primary Examiner* — Hung Le
(74) *Attorney, Agent, or Firm* — Alston & Birch, LLP

(57) ABSTRACT

A method, apparatus, and computer program product are provided to facilitate seamless switching between source and target devices. Relative to the source device, a user interface state of the source device is provided to the target device and database replication is initiated in response to an indication of a switch between the source and target devices. The target device is permitted to access a database of the source device while the source database is replicated to the target device. Relative to the target device and in response to a switch from the source device to the target device, the state is received from the source device in conjunction with an initiation of database replication. The user interface is configured in accordance with the state received from the source device. The target device also directs access to a database of the source device while the source database is replicated.

20 Claims, 9 Drawing Sheets

METHOD AND APPARATUS FOR FACILITATING SWITCHING BETWEEN DEVICES

TECHNOLOGICAL FIELD

An example embodiment of the present invention relates generally to a technique for facilitating the switching between devices and, more particularly, a technique for switching between devices in a manner that maintains the same user interface state and that replicates at least a portion of the database that underlies and supports the user interface.

BACKGROUND

Data or services may be replicated in an active or passive manner. Active replication is performed by processing the same request at every replica. In passive replication, each request is processed by a single replica and then the resulting state of the single replica is transferred to the other replicas.

In a primary-backup scheme, also known as a master-slave scheme, a single master replica is designated to process all of the requests. Alternatively, in a multi-primary scheme, also known as a multi-master scheme, any replica may process a request and then distribute the resulting state to the other replicas. In a multi-master scheme in which two or more databases are connected over a high-latency unreliable network, however, it may prove difficult to maintain synchronization between the databases or at least to maintain synchronization between the databases without incurring a time delay prior to completion of the replication.

Users of computing devices oftentimes utilize two or more computing devices, such as a mobile telephone, a personal digital assistant (PDA), a laptop computer, a tablet computer, a navigation system or the like. Users of multiple devices may desire to switch from one computing device to another computing device. In order to maintain continuity, a user who switches between computing devices may also desire to be presented with the same user interface and to have access to the same data on each of the computing devices. In an instance in which each computing device includes a database including information, such as user personal data, e.g., emails, notes, photos, etc. the databases of the various computing devices utilized by the user are desirably synchronized.

In some instances, such as in instances in which the computing devices are in communication via a high-latency unreliable network, the databases of the various computing devices of the user may not be synchronized at the time at which the user switches from one computing device to another computing device. While the databases may commence replication at the time that the user switches from one computing device to another computing device, the time required for the replication may be longer than the user desires with the user required to rely upon the older, potentially out-of-date data stored by the computing device to which the user switched until the database replication is completed. As such, the switch from one computing device to another computing device may not be as seamless as desired and the user's workflow may be correspondingly interrupted.

BRIEF SUMMARY

A method, apparatus, and computer program product are therefore provided in accordance with an example embodiment to facilitate the switching from a source device to a target device in a seamless manner. In this regard, the method, apparatus, and computer program product of an example embodiment may provide for the user interface (UI) state to be copied from the source device to the target device and may initiate data replication, but the method, apparatus, and computer program product of an example embodiment may also permit the target device to continue to access the database of the source device while the database replication is ongoing. As such, the method, apparatus, and computer program product of an example embodiment permits the user to continue to access the same data from the database of the source device even in an instance in which the database of the target device now utilized by the user has not been replicated, at least not completely.

In one embodiment, a method is provided that includes causing a user interface (UI) state of a source device to be provided to a target device and initiating database replication in response to an indication of a switch from the source device to the target device. The method of this embodiment also permits the target device to access a database of the source device while the source database is replicated to the target device. In this embodiment, the method then completes the database replication.

In another embodiment, an apparatus is provided that includes at least one processor and at least one memory including computer program code with the at least one memory and the computer program code being configured to, with the processor, cause the apparatus to at least cause a user interface (UI) state of a source device to be provided to a target device and initiating database replication in response to an indication of a switch from the source device to the target device. The at least one memory and the computer program code being may also be configured to, with the processor, cause the apparatus of this embodiment to permit the target device to access a database of the source device while the source database is replicated to the target device. In this embodiment, the at least one memory and the computer program code may also be configured to, with the processor, cause the apparatus to complete the database replication.

In a further embodiment, a computer program product is provided that includes at least one non-transitory computer-readable storage medium having computer-readable program instructions stored therein with the computer-readable program instructions comprising program instructions configured to cause a user interface (UI) state of a source device to be provided to a target device and initiating database replication in response to an indication of a switch from the source device to the target device. The computer-readable program instructions of one embodiment include program instructions configured to permit the target device to access a database of the source device while the source database is replicated to the target device. In one embodiment, the computer-readable program instructions also include program instructions configured to complete the database replication.

In yet another embodiment, an apparatus is provided that includes means for causing a user interface (UI) state of a source device to be provided to a target device and initiating database replication in response to an indication of a switch from the source device to the target device. The apparatus of this embodiment also includes means for permitting the target device to access a database of the source device while the source database is replicated to the target device. In this embodiment, the apparatus may also include means for completing the database replication.

In one embodiment, a method is provided that includes, in response to a switch from a source device to a target device, receiving a user interface (UI) state from the source device in conjunction with an initiation of database replication. The method of this embodiment may also cause the UI to be configured in accordance with the UI state received from the source device. In this embodiment, the method may also direct access to a database of the source device while the source database is replicated to the target device.

In another embodiment, an apparatus is provided that includes at least one processor and at least one memory including computer program code with the at least one memory and the computer program code configured to, with the processor, cause the apparatus to at least receive, in response to a switch from a source device to a target device, a user interface (UI) state from the source device in conjunction with an initiation of database replication. The at least one memory and the computer program code may be configured to, with the processor, cause the apparatus of one embodiment to cause the UI to be configured in accordance with the UI state received from the source device. The at least one memory and the computer program code may also be configured to, with the processor, cause the apparatus to direct access to a database of the source device while the source database is replicated to the target device.

In a further embodiment, a computer program product is provided that includes at least one non-transitory computer-readable storage medium having computer-readable program instructions stored therein with the computer-readable program instructions comprising program instructions configured to receive, in response to a switch from a source device to a target device, a user interface (UI) state from the source device in conjunction with an initiation of database replication. The computer-readable program instructions of this embodiment may also include program instructions configured to cause the UI to be configured in accordance with the UI state received from the source device. The computer-readable program instructions may also include program instructions configured to direct access to a database of the source device while the source database is replicated to the target device.

In yet another embodiment, an apparatus is provided that includes means for receiving, in response to a switch from a source device to a target device, means a user interface (UI) state from the source device in conjunction with an initiation of database replication. The apparatus of this embodiment may also include means for causing the UI to be configured in accordance with the UI state received from the source device. The apparatus may also include means for directing access to a database of the source device while the source database is replicated to the target device.

BRIEF DESCRIPTION OF THE DRAWINGS

Figure 1:
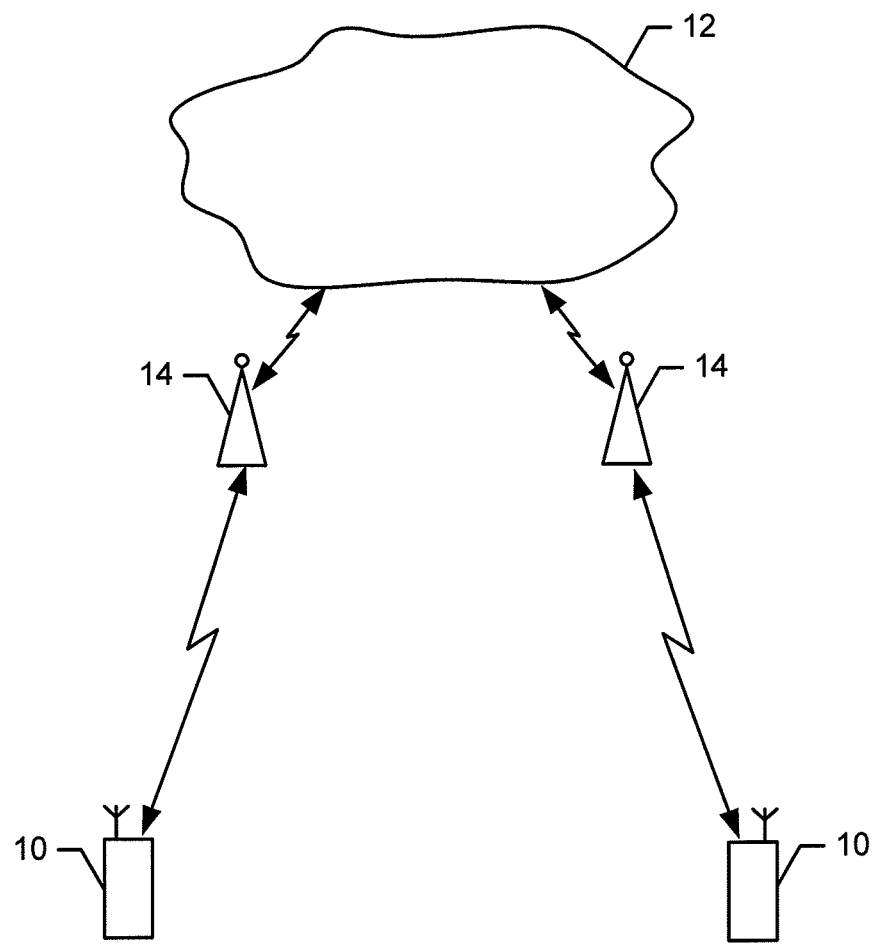
Figure 2:
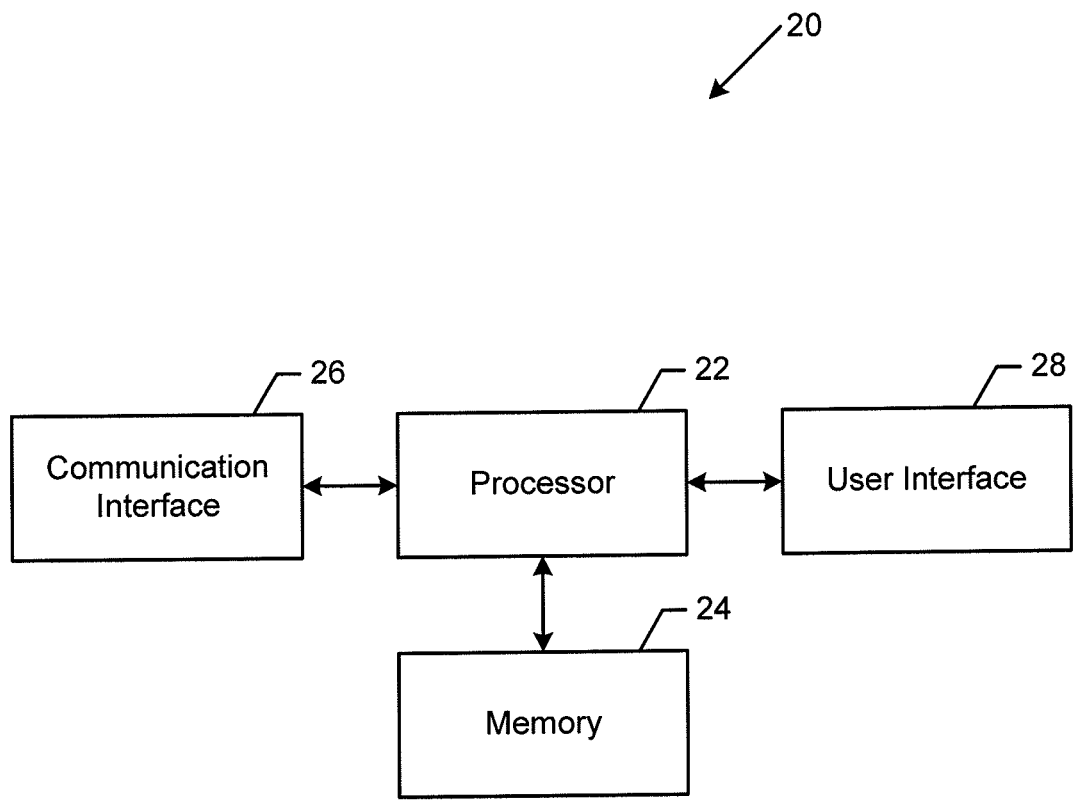
Figure 3:
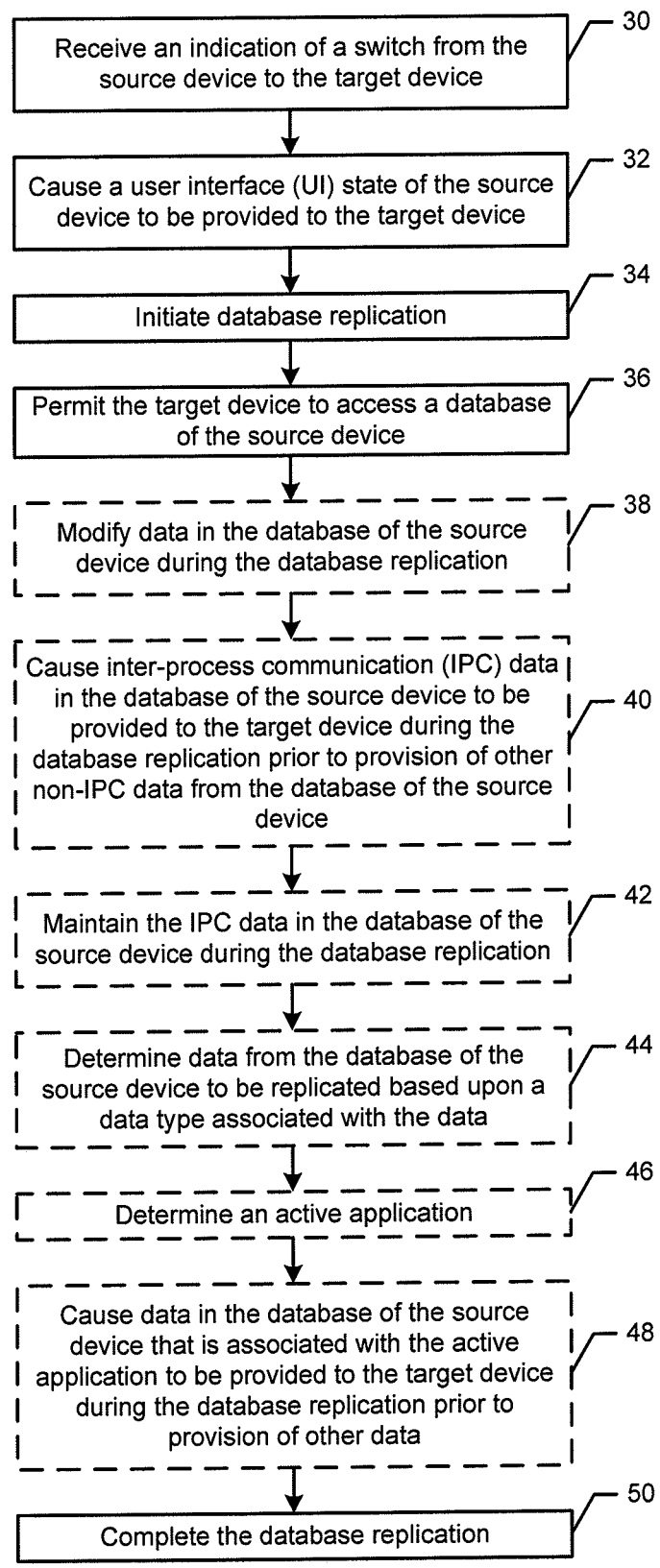
Figure 4:
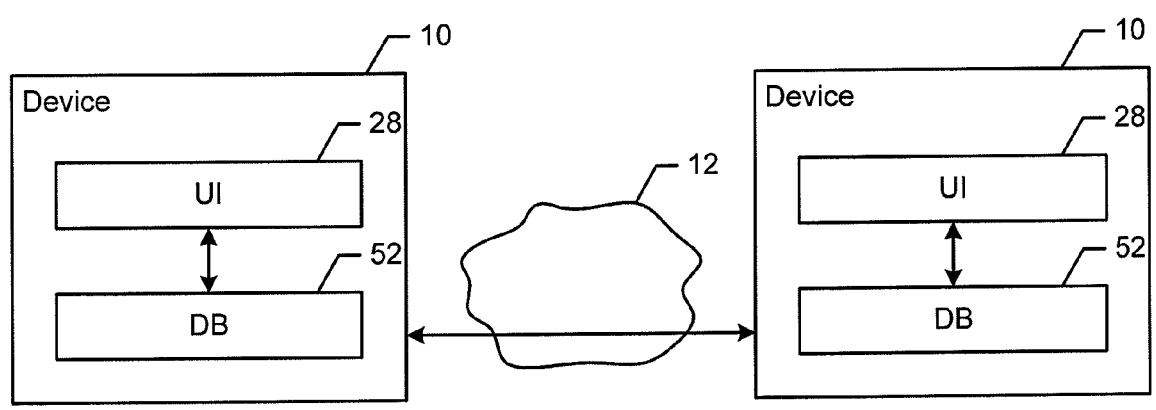
Figure 5:
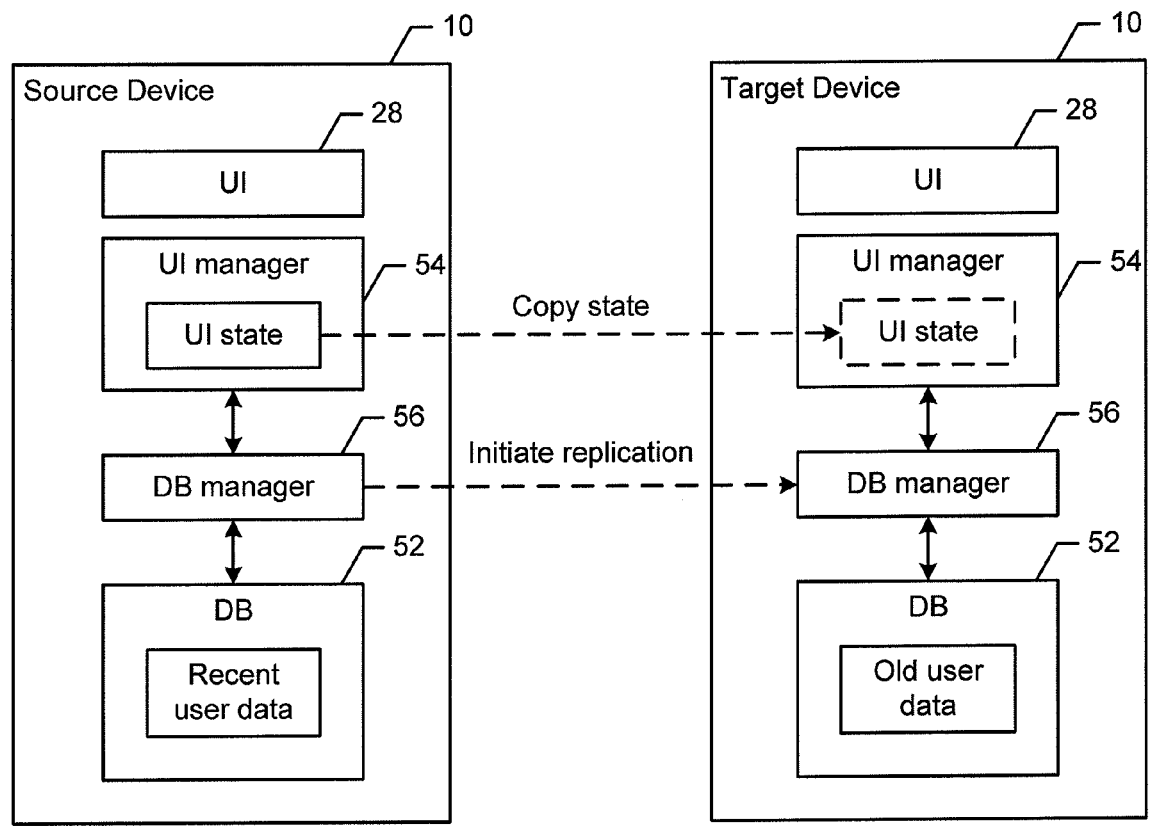
Figure 6:
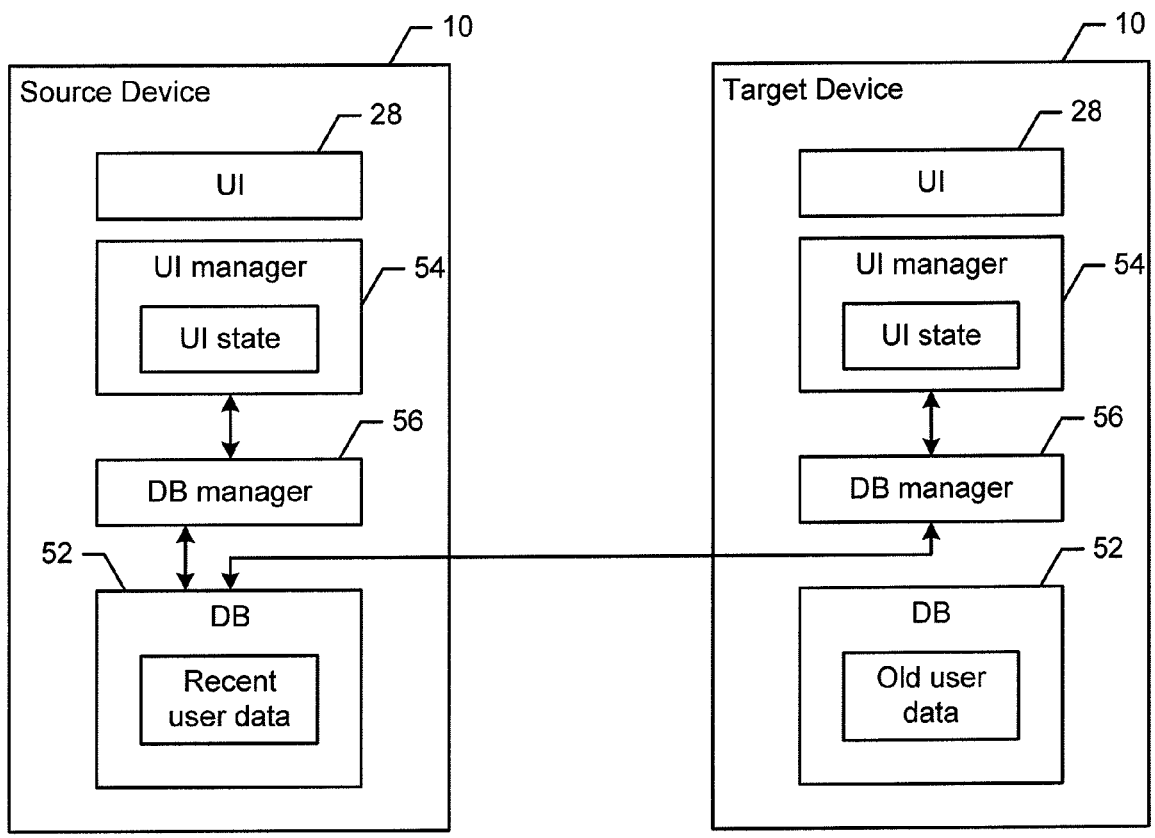
Figure 7:
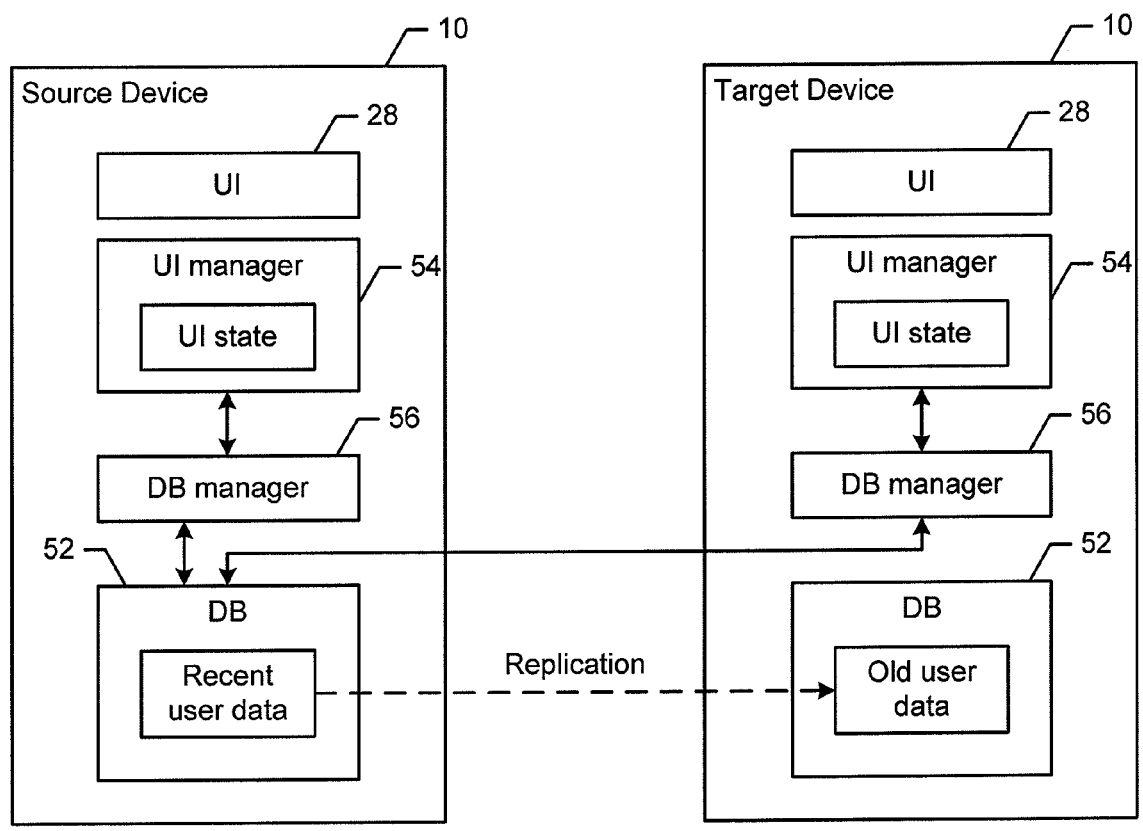
Figure 8:
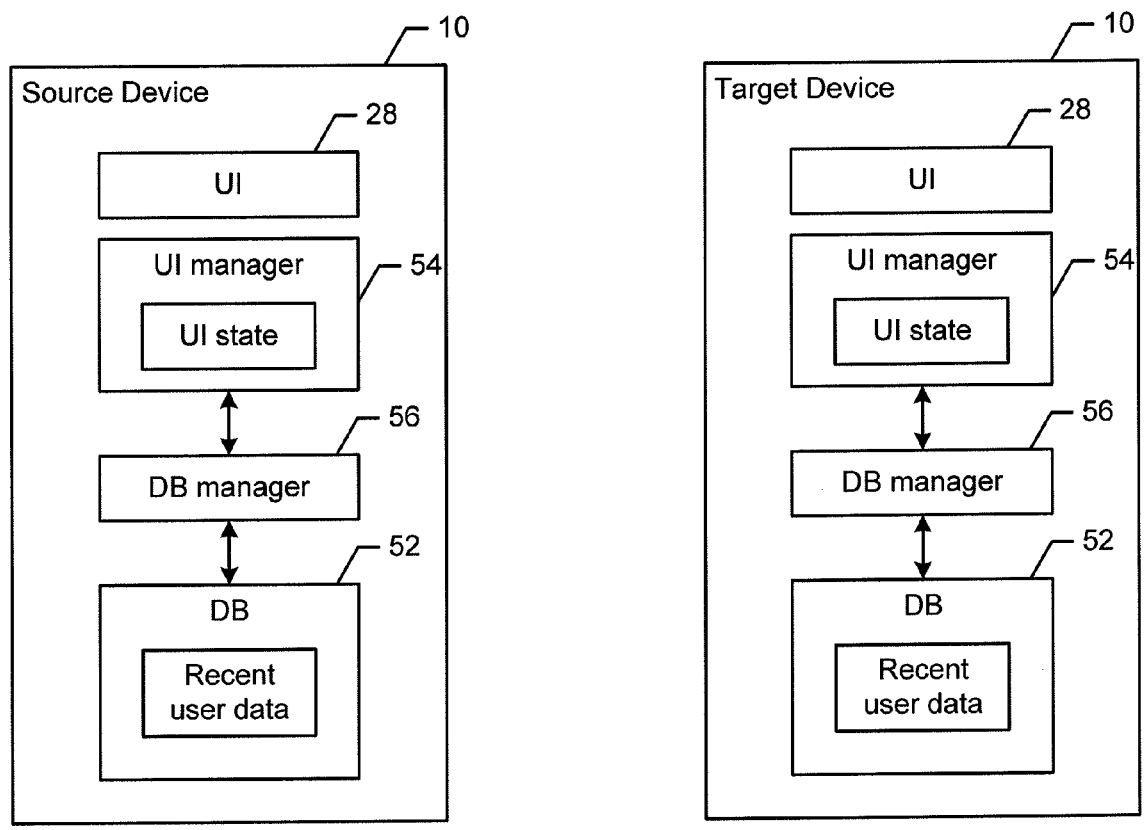
Figure 9:
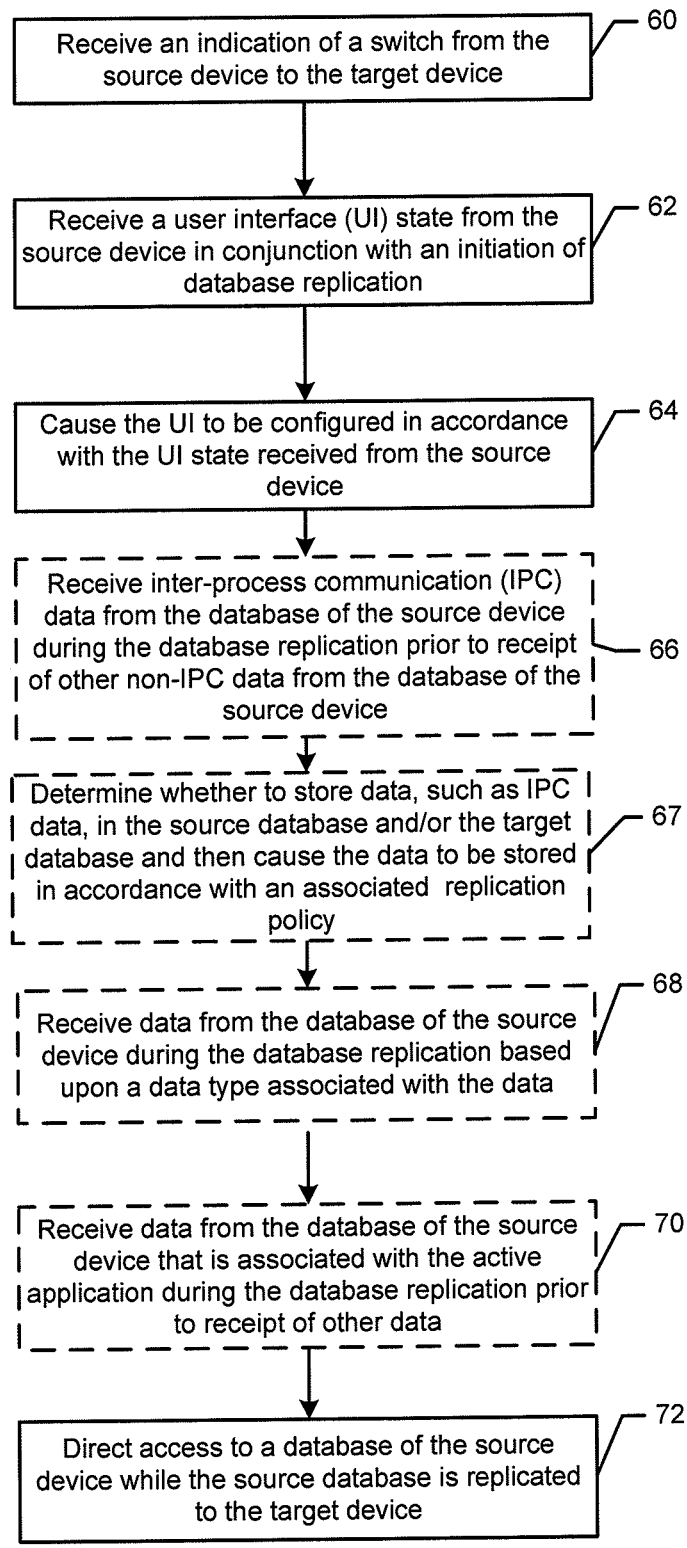

Having thus described certain embodiments of the invention in general terms, reference will now be made to the accompanying drawings, which are not necessarily drawn to scale, and wherein:

FIG. 1 is a schematic representation of a system for facilitating communications between a source device and a target device that may be specifically configured in accordance with an example embodiment of the present invention;

FIG. 2 is a block diagram of an apparatus that may be embodied by or included within a source device or a target device and may be specifically configured in accordance with an example embodiment of the present invention;

FIG. 3 is flowchart illustrating the operations performed by an apparatus embodied by or included within the source device in accordance with an example embodiment of the present invention;

FIG. 4 is a schematic representation of the communication between a source device and a target device at the time at which a user indicates a switch from the source device to the target device in accordance with an example embodiment of the present invention;

FIG. 5 is a schematic representation of a source device and a target device in which the UI state is copied and database replication is initiated in accordance with an example embodiment of the present invention;

FIG. 6 is a schematic representation of a source device and a target device with the target device accessing the database of the source device in accordance with an example embodiment of the present invention;

FIG. 7 is a schematic representation of a source device and a target device which illustrates that database replication is ongoing while the target device is permitted access to the database of the source device in accordance with an example embodiment of the present invention;

FIG. 8 is a schematic representation of a source device and a target device following database replication in accordance with an example embodiment of the present invention; and FIG. 9 is a flowchart illustrating the operations performed by an apparatus embodied by or included within a target device in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

A method, apparatus and computer program product of an example embodiment support the switching of a user from a source device to a target device in a manner that maintains the user interface (UI) state and that continues to provide access to the same data. As such, the method, apparatus and computer program product of an example embodiment may support the user's switch from a source device to a target device in a manner that is relatively, if not entirely, seamless. The user may switch between various types of computing devices including, for example, a mobile telephone, a PDA, a laptop computer, a tablet computer, a navigation system, a music player, a game player or any of numerous other hand held or portable communication devices, computation devices, content generation devices, content consumption devices or combinations thereof. Thus, each of the source device and the target device may be a respective computing device. The source device and the target device may be different types of computing devices in one embodiment or may be the same type of computing devices in another embodiment.

The source device and the target device are configured to be able to communicate with one another. The source device and the target device may communicate in various manners. For example, the source device and the target device may communicate directly with one another, such as via device-to-device communication, or via a local area network or another type of proximity-based network. In one embodiment, however, the source device and the target device may communicate via a wide area network as shown, for example, in FIG. 1. In this regard, the computing devices 10 are each configured to communicate, either wirelessly or via a wireline connection, with a wide area network 12, such as via an access point 14, e.g., a base station, a Node B, an evolved Node B (eNB) or the like. Various types of networks may support communications between the computing devices including, for example, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network or other type of network.

The source device and the target device may each embody or otherwise be associated with an apparatus 20 that is generally depicted in FIG. 2 and that may be configured to perform various operations in accordance with an example embodiment of the present invention as described below, such as in conjunction with FIG. 3 from the perspective of the source device and FIG. 9 from the perspective of the target device. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry that is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and a user interface 28. As such, the processing circuitry may be embodied as a circuit chip (e.g., an integrated circuit chip) configured (e.g., with hardware, software or a combination of hardware and software) to perform operations described herein.

The user interface 28 may be in communication with the processing circuitry to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. In one embodiment, the user interface includes user interface circuitry configured to facilitate at least some functions of the station by receiving user input and providing output.

The communication interface 26 may include one or more interface mechanisms for enabling communication with other computing devices and/or networks. In some cases, the communication interface may be any means such as a device or circuitry embodied in either hardware, or a combination of hardware and software that is configured to receive and/or transmit data from/to a network 12 and/or any other computing device in communication with the processing circuitry, such as between the source device and the target device via the network in the embodiment of FIG. 1 or directly between the source device and the target device in other embodiments. In the embodiment of FIG. 1, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. Additionally or alternatively, the communication interface may be configured to transmit and receive information or other signals via a proximity-based communication protocol, such as via Wi-Fi, NFC, BlueTooth™, WiMAX or the like, so as to support communications with other proximately-located devices.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions for execution by the processor. As described below, the memory may include one or more databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

As noted above, FIGS. 3 and 9 are flowcharts illustrating the operations performed by a method, apparatus and computer program product, such as apparatus 20 of FIG. 2, from the perspective of the source device and the target device, respectively, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 9, when executed, convert a computer or processing circuitry into a particular machine configured to perform an example embodiment of the present invention. Accordingly, the operations of FIGS. 4 and 7 define an algorithm for configuring a computer or processing circuitry, e.g., processor, to perform an example embodiment. In some cases, a general purpose computer may be provided with an instance of the processor which performs the algorithm of FIGS. 3 and 9 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included as shown, for example by the dashed lines in FIGS. 3 and 9. It should be appreciated that each of the modifications, optional additions or amplifications below may be included with the operations above either alone or in combination with any others among the features described herein.

As described below, the source device may receive an indication that the user is switching to a target device and the source device may thereafter provide the UI state to the target device and may initiate database replication. As shown in block 30 of FIG. 3 which illustrates the operations performed by an apparatus 20 embodied by or included within the source device in accordance with an example embodiment, the apparatus may include means, such as the processor 22, the communication interface 26, the user interface 28 or the like, for receiving an indication of the switch from the source device to the target device. The indication may be provided in various manners. For example, the user may provide an indication of the user's intent to switch to the target device by providing input, such as via the user interface, e.g., a keypad, a touch screen display or the like. Alternatively, the user may have provided an indication to the target device, again such as the user interface of the target device, e.g., a keypad, a touch screen display or the like, and the target device may, in turn, communicate with the source device to inform the source device of the switch from the source device to the target device. In addition to indicating that a switch is to occur, the indication of the switch from the source device to the target device may also identify the target device, such as by name, address, e.g., an interne protocol address, or the like.

Thereafter, the source device may establish communications with the target device in order to inform the target device of the switch from the source device to the target device, unless the target device provided the indication of the impending switch to the source device. In addition to advising the target device of the impending switch from the source device to the target device, the source device may also provide the UI state to the target device and may initiate database replication. As such, the apparatus 20 embodied by or included within the source device may include means, such as a processor 22, the communication interface 26 or the like, for causing the UI state of the source device to be provided to the target device and means, such as the processor, the memory 24, the communication interface or the like, for initiating database replication. See blocks 32 and 34 of FIG. 3.

By way of further explanation, reference is now made to FIGS. 4 and 5. In FIG. 4, the source device and the target device are shown prior to the switch from the source device to the target device with an indication that the source device and the target device are capable of communicating with one another, such as via network 12. As shown in FIG. 4, each of the source device and the target device include a user interface 28 and a database (DB) 50 which may, for example, be included within memory 24. Among other functions, the user interface maintains the current UI state of the respective device. The UI state may include the information that is currently displayed and the manner in which the information is currently displayed. The database stores data that may be utilized, for example, by one or more applications that are currently active and that may be presented upon the user interface.

As shown in FIG. 5, upon receipt of an indication that the user is to switch from the source device to the target device, the source device may provide a copy of the UI state to the target device. In this regard, the source device is configured to provide a copy of the current UI state such that the target device is able to present the same UI state as that currently presented by the source device. As shown in FIG. 5, the source device also initiates database replication such that the more recent user data stored by the database of the source device is replicated to the database of the target device and replaces older user data stored therein. As shown in FIG. 5, the source device and the target device may each include a UI manager 54 and a database manager 56. Although the UI manager and the database manager may be configured in various manners, the UI manager and the database manager of one embodiment may each be embodied by the processor 22 of the respective apparatus. As shown in FIG. 5, the UI manager of the source device may be configured to communicate with the UI manager of the target device and, correspondingly, the database manager of the source device may be configured to communicate with the database manager of the target device. Among other things, the UI manager maintains the UI state.

In one embodiment, the UI manager 54 of the source device may initially inform the database manager 56 of the source device that a switch from the source device to the target device is to occur. The database manager of the source device may then initiate database replication. In one embodiment, the database manager, such as embodied by the processor 22 of the source device, may determine whether the database replication will take longer than a predefined time threshold to complete and, if so, the database manager of the source device may inform the database manager of the target device that the target device should utilize the database 52 of the source device following the switch to the target device since the database will not be replicated soon enough. In this embodiment, the UI manager of the source device is also configured to copy the UI state to the UI manager of the target device. Since the UI state can generally be expressed with a much smaller quantity of data than that maintained by the database, the copying of the UI state from the source device to the target device should be relatively quick.

As shown in block 36 of FIG. 3, the apparatus 20 embodied by or included within the source device may also include means, such as the processor 22, the memory 24, the communication interface 26 or the like, for permitting the target device to access the database 52 of the source device while the source database is being replicated to the target device. By allowing the target device to have access to the data of the database of the source device, the target device may have access to the most current data and, in any event, the same data that was relied upon while the user was interacting with the source device. As such, the operation of the target device following the switch to the target device should be based upon the same data as that previously utilized by the source device so as to further facilitate the transition of the user from the source device to the target device. By way of example, FIG. 6 illustrates the access of the database of the source device by the target device and, more particularly, by the database manager 56 of the target device. Further, FIG. 7 illustrates the ongoing access of the database of the source device set by the target device and, more particularly, by the database manager of the target device, that is permitted while the database of the source device is being replicated.

Thereafter, the apparatus 20 embodied by or included within the source device may include means, such as the processor 22, the memory 24, the communication interface 26 or the like, for completing the database replication as shown, for example, by block 50 of FIG. 3. Following completion of the database replication, the database 52 of the target device may store the same data as the database of the source device. In this regard, the database of the target device may store all of the same data as the database of the source device or at least all of the relevant data of the database of the source device. As shown in FIG. 8, following completion of the database replication, a target device need no longer be permitted to access the database of the source device and, instead, the target device may rely upon the data stored in the database of the target device for ongoing operation of the target device.

While the database 52 is being replicated and the target device is accessing the database of the source device, the data stored by the database of the source device may be modified. As such, the apparatus 20 embodied by or included within the source device may include means, such as the processor 22, the memory 24, or the like, for modifying data in the database of the source device during the database replication. See block 38 of FIG. 3. In one embodiment, the modification of the data in the database of the source device may be replicated in the data stored by the database of the target device, at least following database replication. Thus, the data stored by the database of the target device, following database replication, may also include the same modifications that were made during database replication. The modifications to the data may be replicated to the database of the target device in various manners. In one embodiment, the database manager 56 of the target device may log the modifications of the data that are made to the database of the source device during the database replication process and then make the same modifications to the data of the database of the target device following completion of the database replication. In another embodiment, the database replication may be reinitiated each time that the data of the database of the source device is modified, such that the database replication process itself ensures that the modified data is included within the data stored by the database of the target device. In a further embodiment, the modifications to the data may be written to the databases of both the source device and the target device while ensuring that the ongoing database replication does not overwrite the modified data in the database of the target device.

While the database 52 is being replicated and the target device is accessing the database of the source device, requests for data are still routed to the database manager 56 of the target device. The database manager of the target device normally forwards the requests from the application (also referenced herein as the "moved application") for which execution has moved from the source device to the target device to the database of the source device while the database is being replicated, but the database manager of the target device may have different policies for specific types of objects. For example, in a data-driven architecture, a database 52 may be utilized for inter-process communication (IPC). In this regard, the appearance of a certain object or row in a database may trigger a particular action. For example, communication between a messaging application and the short message service (SMS) daemon that controls the regular hardware may be configured such that the messaging application creates an object in the database that describes a message and that has a state designated "outbox." The SMS daemon may be configured to monitor the objects in the database and upon detecting the object having the state "outbox", the SMS data may cause the corresponding SMS message to be transmitted and may change the state of the database object to "sent." The messaging application may also be configured to monitor the database for changes in state of the objects and may correspondingly be able to depict the message in the correct folder.

As such, IPC data, such as IPC objects, rows or other data structures, may be utilized to communicate with an application or with a daemon providing access to device functionality such as camera. In regards to an application executed by the source device and with which the moved application is communicating utilizing IPC data, the application resides on the source device and thus the IPC data should generally be saved to the database of the source device in this scenario. In regards to a daemon, the moved application wants to access the hardware of the target device, so the IPC data should generally be saved in the database of the target device. In one embodiment, however, some hardware might not be present in the target device, but may be present in the source device. In this instance, the moved application may make use of the hardware in the source device in some circumstances. For example, if target device does not have GPS, the moved application may make use of the GPS of the source device. Conversely, if the target device does not have a camera, the moved application likely would still not wish to trigger the camera of the source device. In order to insure that IPC data are properly stored in the source and/or target devices during database replication, the handler of the IPC data may be registered in advance. As such, IPC data may have an associated replication policy, such as a flag associated with the IPC data, that defines whether it is permissible to handle the IPC data with another device, other than the target device. For each IPC data stored by the moved application, the database manager of the target device may determine the handler, and, if a handler is available on the target device, may utilize the handler on the target device, such as to store the IPC data in the database of the target device. However, if there are no compatible handlers on the target device and the replication policy permits handling the IPC data on another device, the IPC data may be stored to, and handled in, the source device. Accordingly, in contrast to other data that is stored in the database of the source device during database replication, an IPC data may be stored in accordance with an associated replication policy and, in one embodiment, may be stored in the database of the target device unless the associated replication policy indicates otherwise In some instances, IPC data may refer to non-IPC data. The non-IPC data should therefore also be stored in a manner consistent with the IPC data because if non-IPC data that has been modified on the target device is written to the database of the source device, subsequent reference to the modified non-IPC data by IPC data may cause a handler of the IPC data on the target device to fetch out-of-date non-IPC data from the target database and not from the source database, where an updated version of the non-IPC data would be found. In order to avoid these issues, IPC data may be required to be self-contained so as not to refer to any other objects, or non-IPC data that are written to the database of the source device may also be cached on the target device such that fetching of non-IPC data that is referenced by IPC data may be serviced first from the cache of the target device and only then from the database of the source device if the non-IPC data was not found within the cache.

In one embodiment, in order to properly utilize database objects for IPC purposes, the apparatus 20 embodied by or included within the source device may include means, such as the processor 22, the memory 24, the communication interface 26 or the like, for causing IPC data in the database of the source device to be provided to the target device during the database replication prior to the provision of other non-IPC data from the database of the source device. See block 40 of FIG. 3. For example, the IPC data may be replicated first, before other data, to the database of the target device so as to avoid further reliance by the target device upon the IPC data stored within the database in the source device.

In one embodiment, the apparatus 20 embodied by or included within the source device may also include means, such as the processor 22, the memory 24, the communication interface 26 or the like, for also maintaining at least some of the IPC data within the database 52 of the source device during the database replication, such as in instances in which the target device is only able to process the IPC data. See block 42 of FIG. 3. In this regard, the maintenance of the IPC data in the database of the source device may be useful in an instance in which an application that was previously executed by the source device is now executed by the target device and desires to communicate with another application that has remained on the source device and has not been transferred to the target device. Additionally or alternatively, the maintenance of the IPC data in the database of the source device may be useful in instances in which the application that is now executed by the target device desires to communicate with a service that is only available on the source device.

In one embodiment, the data stored by the databases 52 of the source device and the target device is not intended to be identical with the database of one device storing device-specific data that may not be unusable by other devices. For example, music data may be stored by an MP3 player, but not by a device having low quality loudspeakers. As such, the apparatus 20 embodied by or included within the source device may include means, such as the processor 22, the memory 24 or the like, for determining the data in the database of the source device that is to be replicated based upon the data type associated with the data. See block 44 of FIG. 3. As such, data from database of the source device is of a data type that is relevant to and usable by the target device may be replicated, but data stored by the database of the source device that is of the data type that is irrelevant to and/or unusable by the target device need not be replicated. In one embodiment, the target device, such as the processor, may have learned from prior user behavior that certain types of data is never or only seldomly used by the target device. In this embodiment, a database manager 56 may choose only certain types of data, e.g., data of a type that has historically been used by the target device, to be replicated from the database of the source device to the database of the target device, such as by being replicated initially prior to replication of other data.

In one embodiment, the source device may be executing several applications prior to the switch to the target device. Each application may provide its own user interface and be associated with certain data. Although several applications may be executing simultaneously, a user may be interacting only with one application, referred to as the active application, at the time at which the user switches from the source device to the target device. As such, the UI state that is transferred from the source device to the target device in one embodiment may not necessarily include the UI state for each of the applications, but, instead, the UI state of the active application as well as the data associated with the active application. As such, the apparatus 20 embodied by or included within the source device may include means, such as the processor 22 or the like, for determining an active application and means, such as the processor, the memory 24, the communication interface 26 or the like, for causing data in the database of the source device associated with the active application to be provided to the target device during the database replication prior to the provision of other data. See blocks 46 and 48 of FIG. 3. As such, the data that is required for the active application may be received by and utilized by the target device prior to receiving other types of data from the source device, if the other types of data are, indeed, ever replicated.

In one embodiment, the source device may initially receive an indication, such as by user input, as to the type of replication to be performed in conjunction with the switch to the target device. For example, the user may select a traditional database replication approach in which the database is replicated prior to use of the target device, thereby potentially delaying the user's use of the target device. Alternatively, the user may select the replication technique of an example embodiment to the present invention in order to provide a more seamless transition.

In one embodiment, the database replication may be triggered by user inactivity. In this regard, database replication may be a time and processing intensive operation that may have a negative effect on the performance of the target device. If large amounts of data are to be replicated, it may be desirable to delay the database replication until the negative effect upon performance will not be visible to the user, such as via the UI. As such, the target device may continue to access the database 52 of the source device without initiating database replication until the target device enters a sleep mode, at which time database replication may be initiated. In addition to or instead of delaying the database replication, the database replication may be avoided altogether in some instances. In this regard, in an instance in which the context of the target and/or source device is such that the user is expected to switch back to the source device relatively soon, such as within a predefined time period, and the source and target devices are expected to remain in communication with one another, database replication may be deferred, perhaps indefinitely, while the target device continues to access the database of the source device until such time that the user switches back to the source device.

Referring now to FIG. 9, the operations performed by an apparatus 20 embodied by or included within the target device are shown. As described above in conjunction with block 30 of FIG. 3, the apparatus embodied by or included within the target device may include means, such as the processor 22, the communication interface 26 or the like, for receiving an indication of a switch from the source device to the target device. See block 60 of FIG. 9. Thereafter, the apparatus embodied by or included within the target device may include means, such as the processor, the communication interface or the like, for receiving a UI state from the source device, such as the current UI state, in conjunction with the initiation of database replication. See block 62. The apparatus embodied by or included within the target device may also include means, such as the processor, the user interface 28 or the like, for causing the UI to be configured in accordance with UI state received from the source device. See block 64. As also discussed above, the apparatus embodied by or included within the target device may also include means, such as the processor, the memory 24, the communication interface or the like, for directing access to the database 50 of the source device while the source database is being replicated to the target device.

As also described above, the database replication may be configured such that certain data may be prioritized and therefore replicated prior to other data. In one embodiment, the apparatus 20 embodied by or included within the target device may include means, such as the processor 22, the memory 24, the communication interface 26 or the like, for receiving IPC data from the database 52 of the source device during the database replication prior to receipt of other non-IPC data from the database of the source device. See block 66 of FIG. 9. As described above, the apparatus 20 embodied by or included within the target device may include means, such as the processor, the memory or the like, for determining whether to store data in the database of the source device and/or the database of the target device, such as in accordance with the various scenarios described above. In this regard, the determination may be based on the data to be stored and, in one embodiment, may be based on whether the data is IPC data. In response to the determination, the apparatus 20 embodied by or included within the target device may include means, such as the processor, the memory or the like, for causing the data, such as the IPC, data to be stored in the respective database such as in accordance with an associated replication policy and, in one embodiment, also in accordance with a handler registered for the IPC data. See block 67. Additionally or alternatively, the apparatus embodied by or included within the target device may include means, such as a processor, the memory, the communication interface or the like, for receiving data, such as by initially receiving data, from the database of the source device during the database replication based upon a data type associated with the data. See block 68. As such, data of certain data types may be replicated prior to data of other data types. Additionally or alternatively, the apparatus embodied by or included within the target device may include means, such as the processor, the memory, the communication interface or the like, for receiving data from the database of the source device that is associated with the active application during the database replication prior to receipt of other data. See block 70.

The method, apparatus and computer program product of an example embodiment therefore facilitate the switching of a user from a source device to a target device in relatively seamless fashion. In this regard, the transfer of the UI state to the target device and the ongoing access by the target device to the database 52 of the source device permits the user to utilize the target device instantly or at least very soon following the switch in the same manner as the source device was utilized prior to the switch. By providing for database replication while the user utilizes the target device and accesses the database of the source device, the database of the target device may be updated and synchronized with the database of the source device such that the target device may subsequently cease access to the database of the source device, such as in an instance in which the target device and the source device are no longer in communication.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
causing a user interface state of a source device to be provided to a target device and initiating database replication in response to an indication of a switch from the source device to the target device;
permitting the target device to access a database of the source device while the database of the source device is replicated to the target device; and
completing the database replication.

2. A method according to claim 1 further comprising modifying data in the database of the source device during the database replication.

3. A method according to claim 1 further comprising causing inter-process communication data in the database of the source device to be provided to the target device during the database replication prior to provision of other non-inter-process communication data from the database of the source device.

4. A method according to claim 1 further comprising determining data from the database of the source device to be replicated based upon a data type associated with the data.

5. A method according to claim 1 further comprising determining an active application and causing data in the database of the source device that is associated with the active application to be provided to the target device during the database replication prior to provision of other data, wherein causing the user interface state of the source device to be provided to the target device comprises causing the user interface state of the active application to be provided to the target device.

6. An apparatus comprising at least one processor and at least one memory including computer program code, the at least one memory and the computer program code configured to, with the processor, cause the apparatus to at least:
cause a user interface state of a source device to be provided to a target device and initiating database replication in response to an indication of a switch from the source device to the target device;
permit the target device to access a database of the source device while the database of the source device is replicated to the target device; and
complete the database replication.

7. An apparatus according to claim 6 wherein the at least one memory and the computer program code are further configured to, with the processor, cause the apparatus to modify data in the database of the source device during the database replication.

8. An apparatus according to claim 6 wherein the at least one memory and the computer program code are further configured to, with the processor, cause the apparatus to cause inter-process communication data in the database of the source device to be provided to the target device during the database replication prior to provision of other non-inter-process communication data from the database of the source device.

9. An apparatus according to claim 6 wherein the at least one memory and the computer program code are further configured to, with the processor, cause the apparatus to determine data from the database of the source device to be replicated based upon a data type associated with the data.

10. An apparatus according to claim 6 wherein the at least one memory and the computer program code configured to, with the processor, cause the apparatus to determine an active application and cause data in the database of the source device that is associated with the active application to be provided to the target device during the database replication prior to provision of other data, wherein the at least one memory and the computer program code are configured to, with the processor, cause the apparatus to cause the user interface state of the source device to be provided to the target device by causing the user interface state of the active application to be provided to the target device.

11. A method comprising:
in response to a switch from a source device to a target device, receiving a user interface state from the source device in conjunction with an initiation of database replication;
causing the user interface to be configured in accordance with the user interface state received from the source device; and
directing access to a database of the source device while the database of the source device is replicated to the target device.

12. A method according to claim 11 further comprising receiving inter-process communication data from the database of the source device during the database replication prior to receipt of other non-inter-process communication data from the database of the source device.

13. A method according to claim 11 further comprising determining, based at least in part on data to be stored, whether to store data to the database of the source device or to a database of the target device while the database of the source device is replicated to the target device.

14. A method according to claim 13 wherein determining whether to store data to the database of the source device or to the database of the target device comprises determining whether to store data to the database of the source device or to the database of the target device based at least in part upon whether the data is inter-process communication data.

15. A method according to claim 11 further comprising receiving data from the database of the source device during the database replication based upon a data type associated with the data.

16. A method according to claim 11 wherein receiving the user interface state comprises receiving the user interface state for an active application, and wherein the method further comprises receiving data from the database of the source device that is associated with the active application during the database replication prior to receipt of other data.

17. An apparatus comprising at least one processor and at least one memory including computer program code, the at least one memory and the computer program code configured to, with the processor, cause the apparatus to at least:
in response to a switch from a source device to a target device, receive a user interface state from the source device in conjunction with an initiation of database replication;
cause the user interface to be configured in accordance with the user interface state received from the source device; and
direct access to a database of the source device while the database of the source device is replicated to the target device.

18. An apparatus according to claim 17 wherein the at least one memory and the computer program code are further configured to, with the processor, cause the apparatus to receive inter-process communication data from the database of the source device during the database replication prior to receipt of other non-inter-process communication data from the database of the source device.

19. An apparatus according to claim 17 wherein the at least one memory and the computer program code are further configured to, with the processor, cause the apparatus to determine, based at least in part on data to be stored, whether to store data to the database of the source device or to a database of the target device while the database of the source device is replicated to the target device.

20. An apparatus according to claim 19 wherein the at least one memory and the computer program code are further configured to, with the processor, cause the apparatus to determine whether to store data to the database of the source device or to the database of the target device by determining whether to store data to the database of the source device or to the database of the target device based at least in part upon whether the data is inter-process communication data.

* * * * *